US012218994B2

United States Patent
Chen et al.

(10) Patent No.: US 12,218,994 B2
(45) Date of Patent: Feb. 4, 2025

(54) PLAYBACK AWARE VIDEO PACKAGING

(71) Applicant: Microsoft Technology Licensing, LLC, Redmond, WA (US)

(72) Inventors: Jianliang Chen, Fremont, CA (US); Federico G. Hlawaczek, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/296,990

(22) Filed: Apr. 6, 2023

(65) Prior Publication Data
US 2024/0340326 A1    Oct. 10, 2024

(51) Int. Cl.
*G06F 15/16*    (2006.01)
*G06F 16/955*    (2019.01)
*H04L 65/60*    (2022.01)
*H04N 21/2387*    (2011.01)
*H04N 21/45*    (2011.01)

(52) U.S. Cl.
CPC ............ *H04L 65/60* (2013.01); *G06F 16/955* (2019.01); *H04N 21/2387* (2013.01); *H04N 21/4524* (2013.01)

(58) Field of Classification Search
CPC . H04L 65/60; H04N 21/2387; H04N 21/4524
See application file for complete search history.

(56) References Cited

U.S. PATENT DOCUMENTS

| 10,230,812 | B1* | 3/2019 | Ram | H04L 65/612 |
| 2012/0170906 | A1* | 7/2012 | Soroushian | H04N 21/23439 |
| | | | | 386/E5.009 |
| 2014/0082684 | A1* | 3/2014 | Frey | H04N 21/23895 |
| | | | | 725/116 |
| 2019/0095403 | A1* | 3/2019 | Parhar | H04L 67/131 |

OTHER PUBLICATIONS

"Encoding", Retrieved From: https://developers.google.com/protocol-buffers/docs/encoding, Jul. 15, 2022, 15 Pages.
"Protocol Buffer Basics: Java", Retrieved From: https://developers.google.com/protocol-buffers/docs/javatutorial#/where-to-find-the-example-code, Jul. 15, 2022, 16 Pages.

(Continued)

*Primary Examiner* — Padma Mundur
(74) *Attorney, Agent, or Firm* — NICHOLSON DE VOS WEBSTER & ELLIOTT LLP

(57) ABSTRACT

Embodiments of media player technologies include a downloadable URL generation system. An online hosting service receives a request including a media identifier (ID). In response to the request, media items associated with the media ID are retrieved. At least some of the retrieved media items are associated with different playback contexts. A playlist summary is generated based on the media ID and at least one of the different playback contexts. The playlist summary includes at least one media reference that can be used to retrieve at least one media item that matches the media ID and at least one of the different playback contexts. A downloadable URL is generated, which includes the media ID and the playlist summary. The downloadable URL is sent to the user device in response to the request.

20 Claims, 7 Drawing Sheets

| Media Item Name | Unique Identifier | MD5 Hash of Unique Identifier | Truncated Hash |
|---|---|---|---|
| hls-480p-30fp-crf28 | YLZvMbhGUAI- | ce445b337e2b25e74e65447adcd91588 | ce |
| hls-720p-30fp-crf28 | YLZvMbhGUAM- | b2dc78a636472a8cd8a22bfa576a292b | b2 |
| video-captions-webvtt | YLZvZDpGUAE- | cc559a068ea869d5640da56f370d1406 | cc |
| video-captions-webvtt | YLZvZDpGUqa- | 5c7fafc7d4ba0b8c4fdececa36bdb4b9 | 5c |

```
<CDN prefix>/dynamic-playlist/D5505AQGj47ah3Vlabe/BAgzrJc
?e=<expiry>&v=<version>&t=<token>
```
←— 410

```
<CDN prefix>/dynamic-playlist/D5505AQGj47ah3Vlabe/BAgzrLM
?e=<expiry>&v=<version>&t=<token>
```
←— 412

(56) References Cited

OTHER PUBLICATIONS

"Snowflake ID", Retrieved From: https://en.wikipedia.org/wiki/Snowflake_ID, Nov. 19, 2022, 3 Pages.
Lindström, et al., "m3u8-parser", Retrieved From: https://github.com/carlanton/m3u8-parser, Oct. 28, 2022, 6 Pages.

* cited by examiner

PLAYBACK AWARE VIDEO PACKAGING

TECHNICAL FIELD

A technical field to which the present disclosure relates is the playback of digital media items.

BACKGROUND

Software applications can use computer networks to distribute digital content among computing devices on a very large scale. Online software applications can regularly receive millions of content uploads and distribute uploaded content items to tens or even hundreds of millions of user devices worldwide. The content items distributed by online software applications include images, audio, video, and other forms of multimedia content.

A media player is a type of application software that plays multimedia computer files such as audio files and/or video files. Media players are designed to play back live or pre-recorded multimedia content using streaming technologies or traditional playback technologies. Examples of media players include video players, audio players, live streaming software, and podcast software.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
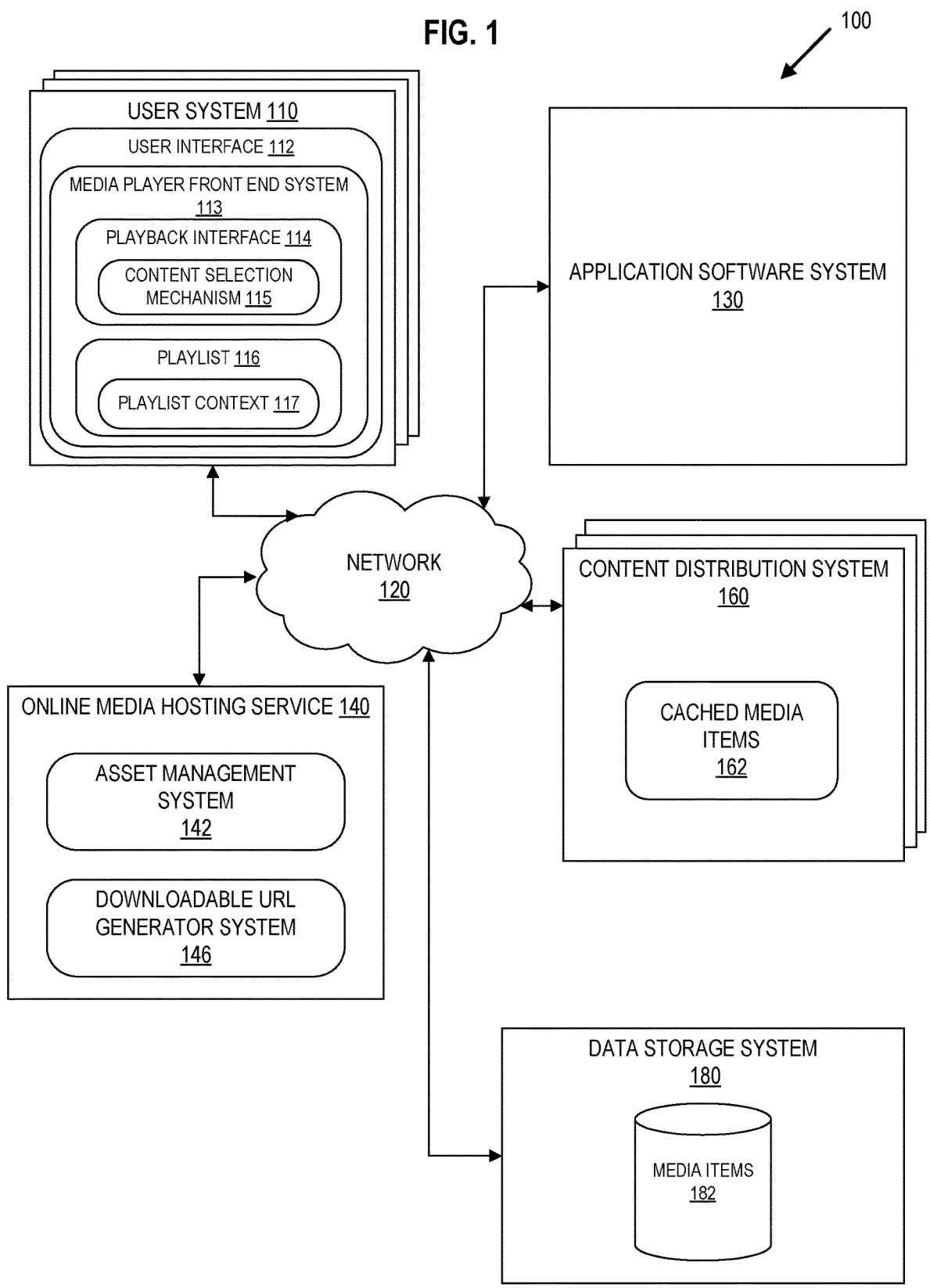
FIG. 1 illustrates an example computing system 100 that includes a downloadable URL generator system in accordance with some embodiments of the present disclosure.

Media player software can be downloaded, stored, and run locally on end user devices or hosted on a network, such as the Internet, by an online hosting service. In hosted implementations, end users view and play back multimedia files through a front end portion of the media player, which is loaded onto their end user devices or implemented in a web browser or mobile app, for example.

A downloadable URL generator system is hosted on a server to provide access to the multimedia files for the media player front end. When an end user requests playback of a multimedia item, the downloadable URL generator system and an asset management system assemble a downloadable URL that provides access to the requested multimedia file and other associated multimedia files, for delivery to the front end at the requesting user's device. Multimedia file, multimedia item, multimedia package, multimedia content, media item, and similar terminology may be used herein to refer to a playable package that includes one or more multimedia files.

In streaming applications, an online media hosting service in cooperation with a content distribution system manage the streaming of the multimedia file to the end user's device in segments, and the media player front end plays the segments of the multimedia file as they are streamed and received at the end user's device from the content distribution system. In non-streaming applications, the online media hosting service manages the download of the multimedia file to the end user's device and the media player front end does not begin playing the file until after all the segments of the file have been completely downloaded. A segment of a multimedia file includes, for example, a temporal sequence of one or more frames of a video, one or more groups of pixels within an image, or one or more pages of a document.

In hosted implementations, the creator of a multimedia file publishes the multimedia file for viewing by other users by uploading the file to an online hosting service, such as for mass consumption. The online hosting service adds the published multimedia file to a searchable repository of multimedia files and displays a selectable link to the published multimedia file on a landing page such as an online video portal. After the multimedia file is published, any user who has access to the online portal, such as by a graphical interface presented by a user system, can view and play back the multimedia file. As a result, many published multimedia files receive hundreds, thousands, or even millions of views through online portals.

The published multimedia files may be viewed in different geolocations, on different platforms, or in different languages. Along with the published multimedia files, additional media items are associated in a playlist depending on the geolocation, video size, language, and other factors. Using current techniques, online hosting services must generate a large number of playlists for every combination of platforms, geo-locations, video dimensions, and language (e.g., subtitle graphics). The number of playlists required becomes unmanageable as the online hosting service expands to include a larger variety of geolocations and platforms.

Hypertext Transfer Protocol (HTTP) Live Stream (HLS) offers more capabilities to package large varieties of auxiliary files along with the main video content, from multi-language subtitles, progress bar preview images, to alternative video renditions of the same piece of content. As a result, packaging all the required auxiliary files along with the videos is essential to deliver great user-experience for video-on-demand content. In existing systems, the HLS packaging process happens at the end of the video processing pipeline and generates a single static HLS main playlist that includes all the video variants and auxiliary files. However, this use of static packaging is not scalable to support multiple subtitle tracks in more than a few languages or to support videos in different codecs for smooth and high-quality video experience based on the network bandwidth and platform during playback due to the large number of static HLS main playlists that have to be created to support the different variants and the storage space required to support the number of HLS main playlists.

This disclosure provides technical solutions to the above-described challenges and other shortcomings of prior media players. In contrast to prior approaches, aspects of the disclosed technologies provide a downloadable link generation system that reduces the reprocessing for adding new media items into playlists in real-time. The downloadable link generation system provides a more flexible framework to support multiple playlists that are created based on a media item that is requested for playback. Using the real-time playlist generation, the same set of language captions can be served to multiple geo-locations, e.g., serving both English and Spanish captions for US and Mexico. In contrast, using existing techniques creates different static playlists for each different geo-location and generates two playlists with the same content.

Aspects of the disclosed technologies can be used to improve media players for many different applications, including social media applications, online learning, and others. For example, the disclosed technologies address the problem of how to stream media content from a content distribution system to user devices in an interactive, online context in which thousands or millions of users of a networked system may be browsing search results or scrolling through a news feed at the same time or at different times, using many different configurations of devices and network connections, including potentially widely varying constraints on computer processing and storage resources. As used herein, content distribution system may refer to any type of network-based application software system that distributes digital content to user devices via a network. For example, news, entertainment, and e-commerce apps installed on mobile devices, enterprise systems, messaging systems, and social graph-based applications can all function as content distribution systems.

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates an example of a computing system 100 that includes a dynamic link generator system in accordance with some embodiments of the present disclosure. In the embodiment of FIG. 1, computing system 100 includes one or more user systems 110, a network 120, an application software system 130, an online media hosting service 140, a content distribution system 160, and a data storage system 180.

As described in more detail below, some components of the dynamic link generator system are implemented in an online media hosting service 140 of computing system 100. In the implementation of FIG. 1, a content selection mechanism 115 and playlist 116 are components of media player front end system 113 while an asset management system 142, and a downloadable URL generator system 146 are components of online media hosting service 140. Also, in the implementation of FIG. 1, media player front end system 113 is a component of a user interface 112 of user system 110 and downloadable URL generator system 146 is a component of online media hosting service 140.

A user system 110 includes at least one computing device, such as a personal computing device, a server, a mobile computing device, or a smart appliance, and at least one software application or at least one computing device is capable of executing. Many different user systems 110 can be connected to network 120 at the same time or at different times. Different user systems 110 can contain similar components as described in connection with the illustrated user system 110. For example, many different end users of computing system 100 can be interacting with many different instances of media player front end system 113 on their respective user systems 110, at the same time or at different times.

User system 110 includes a user interface 112. User interface 112 is installed on or accessible to user system 110 by network 120. For example, embodiments of user interface 112 include a graphical display screen that includes at least one slot. A slot as used herein refers to a space on a graphical display such as a web page or mobile device screen, into which digital content including multimedia files may be loaded for display to the user. The locations and dimensions of a particular slot on a screen are specified using, for example, a markup language such as HTML (Hypertext Markup Language). On a typical display screen, a slot is defined by two-dimensional coordinates. In other implementations such as virtual reality or augmented reality implementations, a slot may be defined using a three-dimensional coordinate system.

User interface 112 can be used to input data, upload, download, receive, send, or share content including multimedia files, initiate user interface events, and view or otherwise perceive output such as data produced by application software system 130, online media hosting service 140, and/or content distribution system 160. For example, user interface 112 can include a graphical user interface (GUI), a conversational voice/speech interface, a virtual reality, augmented reality, or mixed reality interface, and/or a haptic interface. User interface 112 includes a mechanism for logging in to application software system 130 and/or online media hosting service 140, clicking or tapping on GUI elements, and interacting with digital content items such as multimedia files. Examples of user interface 112 include web browsers, command line interfaces, and mobile app front ends. User interface 112 as used herein can include application programming interfaces (APIs).

Media player front end system 113 includes a playback interface 114 and a playlist 116. Playback interface 114 enables previously recorded multimedia files to be played back on user system 110. Playlist 116 includes a list of multiple multimedia files to be played on the playback interface 114 and/or for playback through a playback interface 114 of any user system 110 connected to network 120.

Playback interface 114 includes content selection mechanism 115. Content selection mechanism 115 enables users viewing multimedia files through playback interface 114 to select media items from the playlist to playback through the playback interface. Example implementations of content selection mechanism 115 are described below.

Playlist 116 includes playlist context 117. Playlist context 117 includes multiple media items identifying a set of features representing perceptual attributes of a media item being played by the playback interface 114, the perceptual attributes including at least one of a language, a height of the media item, a width of the media item, or subtitles. Different perceptual attributes such as different languages of subtitles or alternative video renderings (e.g., different video formats of the same content) form a different playlist context 117.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Application software system 130 is any type of application software system that provides or enables the creation and/or distribution of at least one form of digital content including multimedia files to user systems such as user system 110 through user interface 112. In some implementations, online media hosting service 140 and/or asset management system 142 or downloadable URL generator system 146 are components of application software system 130. Examples of application software system 130 include but are not limited to online services such as online learning or education platforms, professional social network software and/or other social graph-based applications, as well as other online systems that are or are not based on social graph software, such as general-purpose search engines, specific-purpose search engines, messaging systems, content distribution platforms, e-commerce software, enterprise software, or any combination of any of the foregoing or other types of software.

In some implementations, application software system 130 is a software as a service (SaaS) platform that hosts and streams multimedia files through online media hosting service 140. An end-user of the user system 110 can use any available platform or tool to request playback of a media item that includes an associated playback context. To view media items from the data storage system 180, the user systems 110 of the end users connect to the online media hosting service 140 through the media player front end system 113. In these implementations, the viewing user systems 110 download or stream multimedia files from cloud servers to which they are redirected by the playback interface 114.

A client portion of application software system 130 can operate in user system 110, for example as a plugin or widget in a graphical user interface of a web application, mobile software application, or as a web browser executing user interface 112. For example, media player front end system 113 can be implemented in a client portion of application software system 130, and content selection mechanism 115 and/or playlist context 117 can be implemented as plugins to display visual elements that are registered with the media player front end system 113.

In an embodiment, a mobile app or a web browser of a user system 110 can transmit a network communication such as an HTTP request over network 120 in response to user input that is received through a user interface provided by the web application, mobile app, or web browser, such as user interface 112. A server running application software system 130 can receive the input from the web application, mobile app, or browser executing user interface 112, perform at least one operation using the input, and return output to the user interface 112 using a network communication such as an HTTP response, which the web application, mobile app, or browser receives and processes at the user system 110.

Online media hosting service 140 includes asset management system 142. Asset management system 142 stores location data of playable media items that can be requested for playback by various instances of media player front end system 113 implemented on various user systems 110 and sends media items to the content distribution system 160 for providing access to the user system 110. For example, the asset management system 142 identifies multiple video files, stored on the data storage system 180, that include additional media items that are associated with each video file. The additional media items include at least one of the language, height of the first media item, width of the first media item, and/or subtitle graphics for the video file.

The asset management system 142 constructs the playlist summary, which can be constructed based on the media ID such as a MD5 hash (128 bits) of the media ID. This cryptographic signature of each media ID can be generated during the runtime (e.g., decoration time) or processing time if the computation cost of MD5 is significant enough to decrease performance of the asset management system 142. The asset management system 142 generates the playlist summary based on packaging instructions for generating playlist summaries.

For example, the asset management system 142 checks the data storage system 180 to determine if all media items are available to send to the user system 110. If one of the media items is unavailable, asset management system 142 will exclude the unavailable media items from any downloadable URL. To create the playlist summary, the asset management system 142 computes a MD5 hash for each unique identifier of all the available media items. By using the unique identifier (ID) for creating the playlist summary, the reprocessing time is reduced in comparison to conventional techniques because the IDs are updated every time the media item is reprocessed (e.g., a language change, a size change, etc.). Using the set of hashes generated from the unique identifiers, the asset management system 142 computes the minimum length of bytes to represent all the media items uniquely. The asset management system 142 uses the minimum length of the hashes to represent each media item, rather than using full hashes of the ID, which is 128 bits. For example, as described in additional detail with reference to FIG. 4, the hashes are truncated to reduce the length of the hash. The asset management system concatenates the truncated hashes together to form a playlist summary along with a playlist version number and an integer (e.g., a varint) that specifies the common length of truncated hashes. The asset management system 142 asset management system 142 receives a request for a media item and asset management system 142 generates a playlist summary that includes media references (e.g., a uniform resource name (URN)). The playlist summary is used to retrieve the video or the associated additional media item from its back end storage location. The asset management system 142 provides the list of media items to the downloadable URL generator system 146.

Online media hosting service 140 also includes asset management system 142 and downloadable URL generator system 146. The downloadable URL generator system 146 generates a downloadable uniform resource locator (URL) that includes the video file and the associated additional media items. For example, the downloadable URL generator system 146 packages the media references into the downloadable URL such that the downloadable URL provides access to the media items. In some embodiments, the downloadable URL generator system 146 includes a set of features that correspond to the video file and the media player front end system 113. The set of features can include a progress bar associated with the video, a set of preview images associated with the video, alternative renderings of the video, a set of subtitles associated with the video, an alternative language audio track associated with the video, or an alternative display size of the video. The set of features are described below but can be different based on the location or language settings of the user system 110 that is executing the media player front end system. The downloadable URL generator system 146 sends the downloadable URL to the user system 110.

Some implementations utilize a secure public protected API to ensure that requested media items are properly communicated between the user systems to the online media hosting service 140. For example, a secure public protected API is used to pass media items and the associated URNs and URLs between a user system's browser or mobile device and the online media hosting service 140. A communication between the media player front end system 113 and online media hosting service 140 includes, for example, a session identifier or other form of identifier that identifies the source user account associated with the login and viewing of the multimedia file through playback interface 114. The request including the session identifier (or other suitable identifier) establishes bidirectional communication between the media player front end system 113 and online media hosting service 140 before the requested multimedia file is played in playback interface 114.

Content distribution system 160 is a data storage service, such as a web server, which stores digital content items and delivers digital content items, such as media items 182, to, for example, web sites and mobile apps or to particular slots of web sites or mobile app user interface display screens. For instance, content distribution system 160 provides the user system access to cached media items 162. The cached media items stored and distributed by content distribution system 160 can contain various types of content including video and/or audio streams.

In some embodiments, content distribution system 160 processes requests from, for example, application software system 130 or online media hosting service 140, and distributes cached media items, including multimedia files, to user systems 110 in response to requests. A request is, for example, a network message such as an HTTP (HyperText Transfer Protocol) request for a transfer of data from an application front end to the application's back end, or from the application's back end to the front end. A request is formulated, e.g., by a browser or mobile app at a user device, in connection with a user interface event such as a login, click or a page load. In some implementations, content distribution system 160 is part of application software system 130 or online media hosting service 140.

Data storage system 180 includes data stores and/or data services that store digital content items including multimedia files, data received, used, manipulated, and produced by application software system 130 and/or online media hosting service 140, including video files and additional media files that define the language, height of the first media item, width of the first media item, and/or subtitle graphics for the video file. In some embodiments, data storage system 180 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine.

Data stores of data storage system 180 can be configured to store data produced by real-time and/or offline (e.g., batch) data processing. A data store configured for real-time data processing can be referred to as a real-time data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 180 resides on at least one persistent and/or volatile storage device that can reside within the same local network as at least one other device of computing system 100 and/or in a network that is remote relative to at least one other device of computing system 100. Thus, although depicted as being included in computing system 100, portions of data storage system 180 can be part of computing system 100 or accessed by computing system 100 over a network, such as network 120.

While not specifically shown, it should be understood that any of user system 110, application software system 130, online media hosting service 140, content distribution system 160, and data storage system 180 includes an interface embodied as computer programming code stored in computer memory that when executed causes a computing device to enable bidirectional communication with any other of user system 110, application software system 130, online media hosting service 140, content distribution system 160, and data storage system 180 using a communicative coupling mechanism. Examples of communicative coupling mechanisms include network interfaces, inter-process communication (IPC) interfaces and application program interfaces (APIs).

Each of user system 110, application software system 130, online media hosting service 140, content distribution system 160, and data storage system 180 is implemented using at least one computing device that is communicatively coupled to electronic communications network 120. Any of user system 110, application software system 130, online media hosting service 140, content distribution system 160, and data storage system 180 can be bidirectionally communicatively coupled by network 120. User system 110 as well as other different user systems (not shown) can be bidirectionally communicatively coupled to application software system 130.

A typical user of user system 110 can be an administrator or end user of application software system 130, online media hosting service 140 and/or content distribution system 160. User system 110 is configured to communicate bidirectionally with any of application software system 130, online media hosting service 140 and/or content distribution system 160 over network 120.

Terms such as component, system, and model as used herein refer to computer implemented structures, e.g., combinations of software and hardware such as computer programming logic, data, and/or data structures implemented in electrical circuitry, stored in memory, and/or executed by one or more hardware processors.

The features and functionality of user system 110, application software system 130, online media hosting service 140, content distribution system 160, and data storage system 180 are implemented using computer software, hardware, or software and hardware, and can include combinations of automated functionality, data structures, and digital data, which are represented schematically in the figures. User system 110, application software system 130, online media hosting service 140, content distribution system 160, and data storage system 180 are shown as separate elements in FIG. 1 for ease of discussion but, except as otherwise described, the illustration is not meant to imply that separation of these elements is required. The illustrated systems, services, and data stores (or their functionality) of each of user system 110, application software system 130, online media hosting service 140, content distribution system 160, and data storage system 180 can be divided over any number of physical systems, including a single physical computer system, and can communicate with each other in any appropriate manner.

Figure 7:
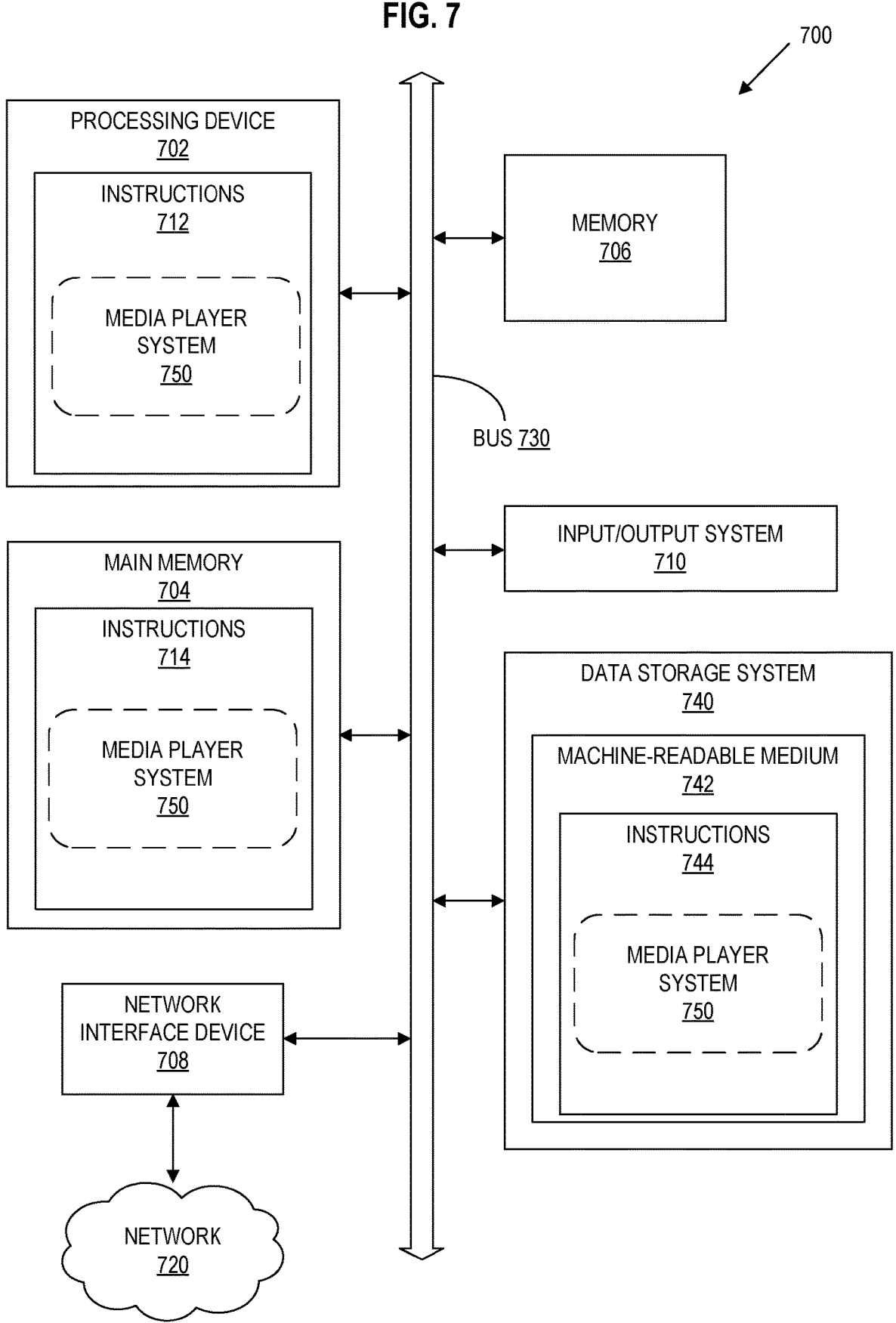
FIG. 7 is a block diagram of an example computer system 700 including a media player system 750 in accordance with some embodiments of the present disclosure.

For ease of discussion, in FIG. 7, the online media hosting service 140 is represented as media player system 750. Further details with regards to the operations of the online media hosting service 140 are described below.

Figure 2:
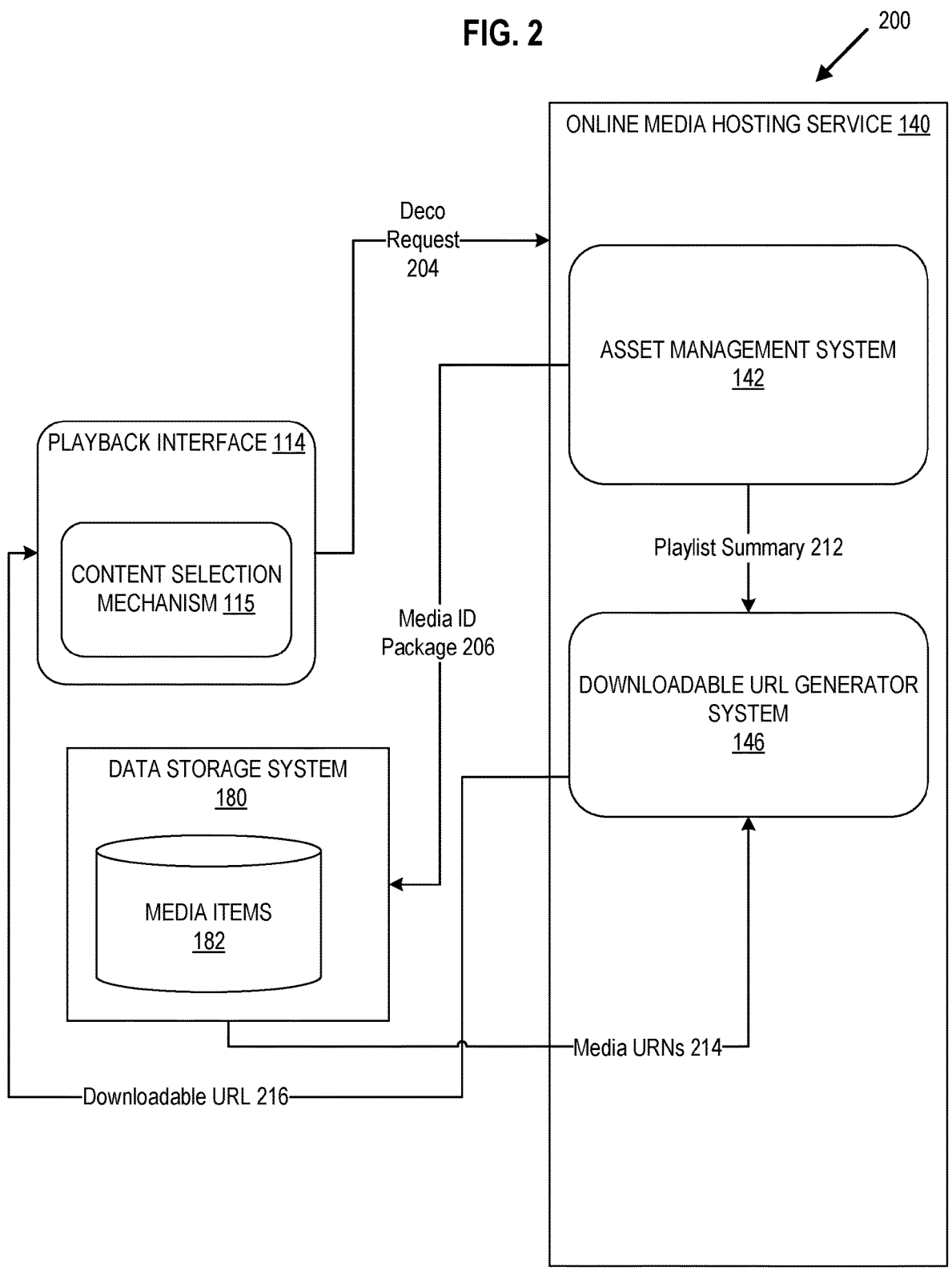
FIG. 2 is a flow diagram of an example method 200 for generating and sending a downloadable URL in accordance with some embodiments of the present disclosure.

FIG. 2 is a flow diagram of an example method 200 for generating and sending a downloadable URL in accordance with some embodiments of the present disclosure. The method 200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by various components of the computing system 100 of FIG. 1 including portions of media player front end system 113 and/or portions of online media hosting service 140. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, processes can be omitted in various embodiments. Thus, not all processes are required in every embodiment. Other process flows are possible.

In FIG. 2, according to the method 200, an end-user operating a user device 110 executing playback interface 114 sends a deco request 204 relating to a media item to the online media hosting service 140. The deco request 204 identifies a media item, such as by a media identifier (ID), to the online media hosting service 140. The asset management system 142 receives the deco request 204 and matches the media ID to multiple additional media items associated with various playback contexts of the media item. For example, the asset management system 142 identifies that the media ID in the playback request corresponds to a video file associated with playback contexts including a height of 256 units (e.g., dots per inch or pixels), a width of 256 units, and subtitle graphics corresponding to a French translation of the audio in the video file. The asset management system 142 adds the additional media IDs of each of the media items associated with the media ID from the deco request 204 to the media ID package 206. The media ID package 206 includes the media ID from the deco request 204 and the additional media IDs.

The asset management system 142 uses media ID package 206 to retrieve the media URNs 210 for each media item of the media ID package 206. The URN of each media item is a unique media reference that can be used to retrieve the media items identified by media ID package 206 from the data storage system 180. The asset management system 142 determines whether each media item of media ID package 206 stored in media items 182 of the data storage system 180 is available for inclusion in the playlist summary. For example, the asset management system 142 determines if the URN of each media item is accessible for playback. The asset management system 142 generates a playlist summary 212 that identifies each of the media items and locations for the downloadable URL generator system 146. Additional details of the playlist summary are described below with reference to FIG. 4.

The downloadable URL generator system 146 creates a downloadable URL (e.g., an accessible hyperlink) including each media item of the playlist summary 212. To create the downloadable URL, the downloadable URL generator system 146 uses the playlist summary 212 from the asset management system to locate and access each of the media items. For example, the downloadable URL generator system uses the playlist summary 212 to execute a search of the data storage system 180 to determine a server location of the media items identified by the playlist summary. The server location of the media items is represented by a media URN 214. Using the results of the search of the data storage system 180, the downloadable URL generator system 146 generates a downloadable URL 216 that can be used to access the location of each media item. The downloadable URL generator system 146 aggregates the media URNs 214 to generate the downloadable URL 216, such as by encoding each URN into the downloadable URL 216. For example, each URN 214 is a string of characters that identify the media item. To combine the media URNs 214, the downloadable URL generator system 146 concatenates the media URNs 214 or a representation (e.g., truncations) of the media URNs 214. After generation of the downloadable URL 216, the online media hosting service 140 sends the downloadable URL 216 to the user system 110, e.g., in response to a playback request communicated by the user system 110 to the asset management system 142.

Figure 3:
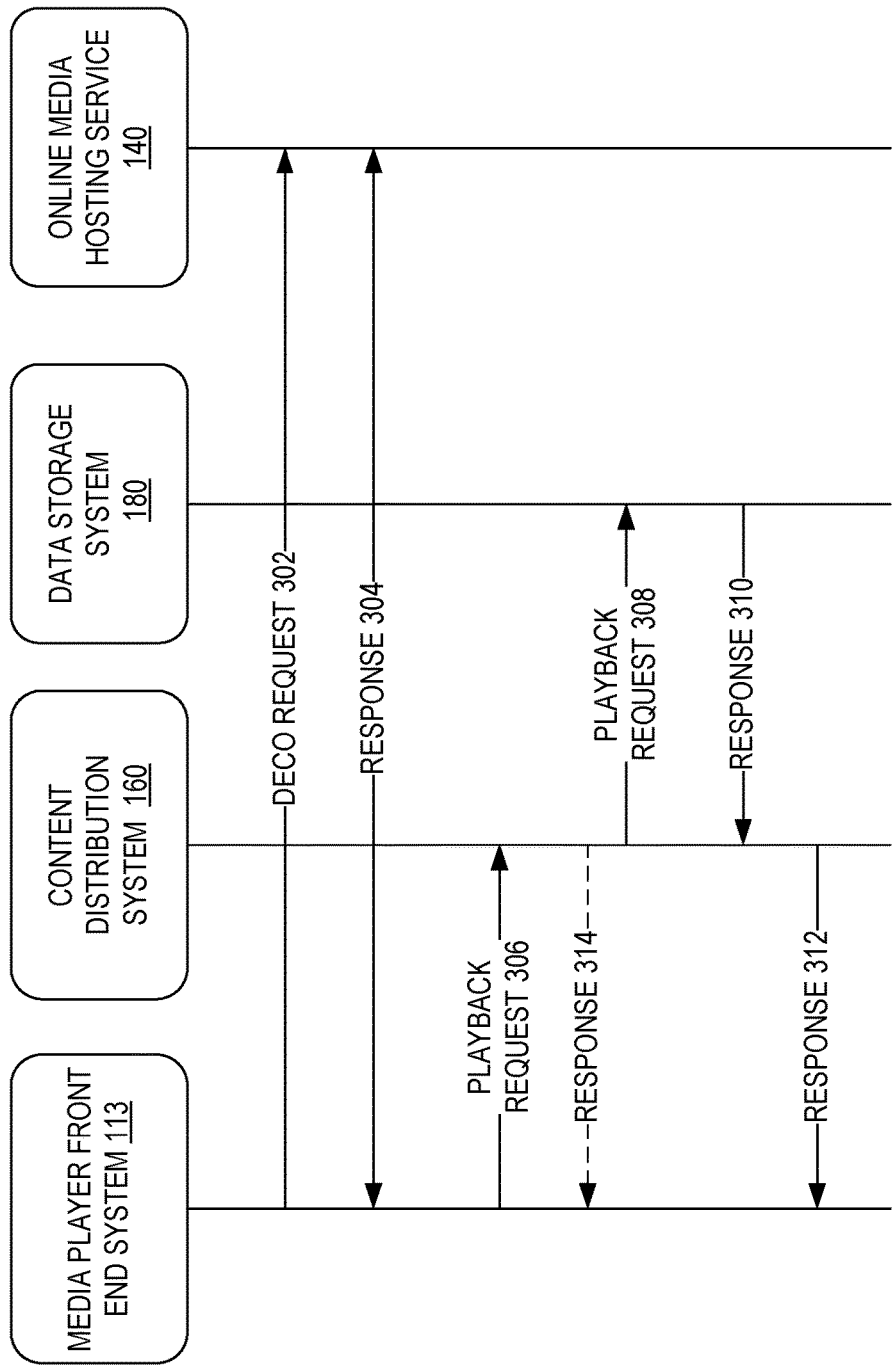
FIG. 3 is a timing diagram of an example method 300 for generating and sending a downloadable URL in accordance with some embodiments of the present disclosure.

FIG. 3 is a timing diagram of an example method 300 for generating and sending a downloadable URL in accordance with some embodiments of the present disclosure.

The method 300 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by various components of the computing system 100 of FIG. 1 including portions of media player front end system 113 and/or online media hosting service 140. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, processes can be omitted in various embodiments. Thus, not all processes are required in every embodiment. Other process flows are possible.

The method 300 transforms a deco request 302, which identifies, for example, a media ID and a playback context, into a downloadable URL that includes all media items associated by, e.g., the asset management system 142 or online media hosting service 140, with the media ID and the playback context identified in the deco request 302. The downloadable URLs are generated by the asset management system 142 or online media hosting service 140 as a result of the method 300. The downloadable URLs are provided by the asset management system 142 or online media hosting service 140 to the requesting user systems 110. A downloadable URL generated as a result of the method 300 contains, for example, a media ID, an expiration time of the URL, and a signed token.

In some implementations, the signed token is based on a message authentication code, such as the HMAC (hash-based message authentication code) of the downloadable URL. The signed token can be used by, e.g., content distribution system 160 or user systems 110, to verify the integrity of received downloadable URLs. As further described above, the media player front end system 113 initiates the method 300 by sending a deco request 302 to e.g., the asset management system 142, where the deco request 302 requests playback of a media item. An example of a deco request is an HTTP (Hyper-Text Transfer Protocol) call to a server, where the HTTP call includes a request for the server to retrieve from storage a specific media resource such as a video file (e.g., a GET request) that is specially configured or "decorated" based on the playback context.

The online media hosting service 140 receives the deco request 302 and identifies the media item from a media ID included in the deco request 302. For example, the asset management system 142 identifies the media item and matches the media ID in the deco request 302 to multiple additional media items of the asset management system 142 that are stored by, e.g., the data storage system 180. In some embodiments, the asset management system 142 extracts the media ID from the playback request. The asset management system 142 determines the media ID and identifies a video file that is accessible on mobile devices using various media players. The asset management system 142 selects additional media IDs that are associated with the media ID. The asset management system 142 generates a media ID package including the media ID from the deco request 302 and the additional media IDs.

The asset management system 142 uses the media ID package to retrieve the media URNs for each media item of the media ID package. The asset management system 142 determines if each media item is accessible for playback. The asset management system 142 generates a response 304 that includes a downloadable URL and the playlist summary. In the example illustrated by FIG. 3, the media player front end system 113 sends playback request 308 to the content distribution system 160 that includes a feature map associated with an instance or version of a graphical user interface. For example, the feature map has a schema that accommodates different configurations of the graphical user interface. In the playback request 308306, the media player front end system 113 includes the set of features to be enabled for this playback request. The set of features requested is based on the on-device setting, geo-location, and playback platform. Additional details of feature maps are described with reference to FIG. 5.

The content distribution system 160 sends a playback request 308 to the data storage system 180. The playback request 308 requests to download the media playlist using the downloadable URL and the feature map from the playback request 306. In response to receiving the playback request 308, the data storage system 180 provides a dynamically generated media playlist using the playlist summary and the feature map. The data storage system 180 communicates response 310 that includes the dynamically generated media playlist to the content distribution system 160. After receiving the response 310, the content distribution system 160 sends a response 312 to media player front end system 113 that includes the dynamically generated media playlist for the specific features requested by the media player front end system 113. In some embodiments, the data storage system 180 receives the playback request 308 and interprets the playback request to generate a list of media IDs to provide to the media player front end system 113.

In some embodiments, after the first playback request 306 from the media player front end system 113 to the content distribution system 160, the playlist represented by the downloadable URL is cached at the content distribution system 160. If the content distribution system 160 receives subsequent playback requests for the same media ID and playback context, the content distribution system 160 generates response 314 from the cache of the content distribution system.

Figure 4:
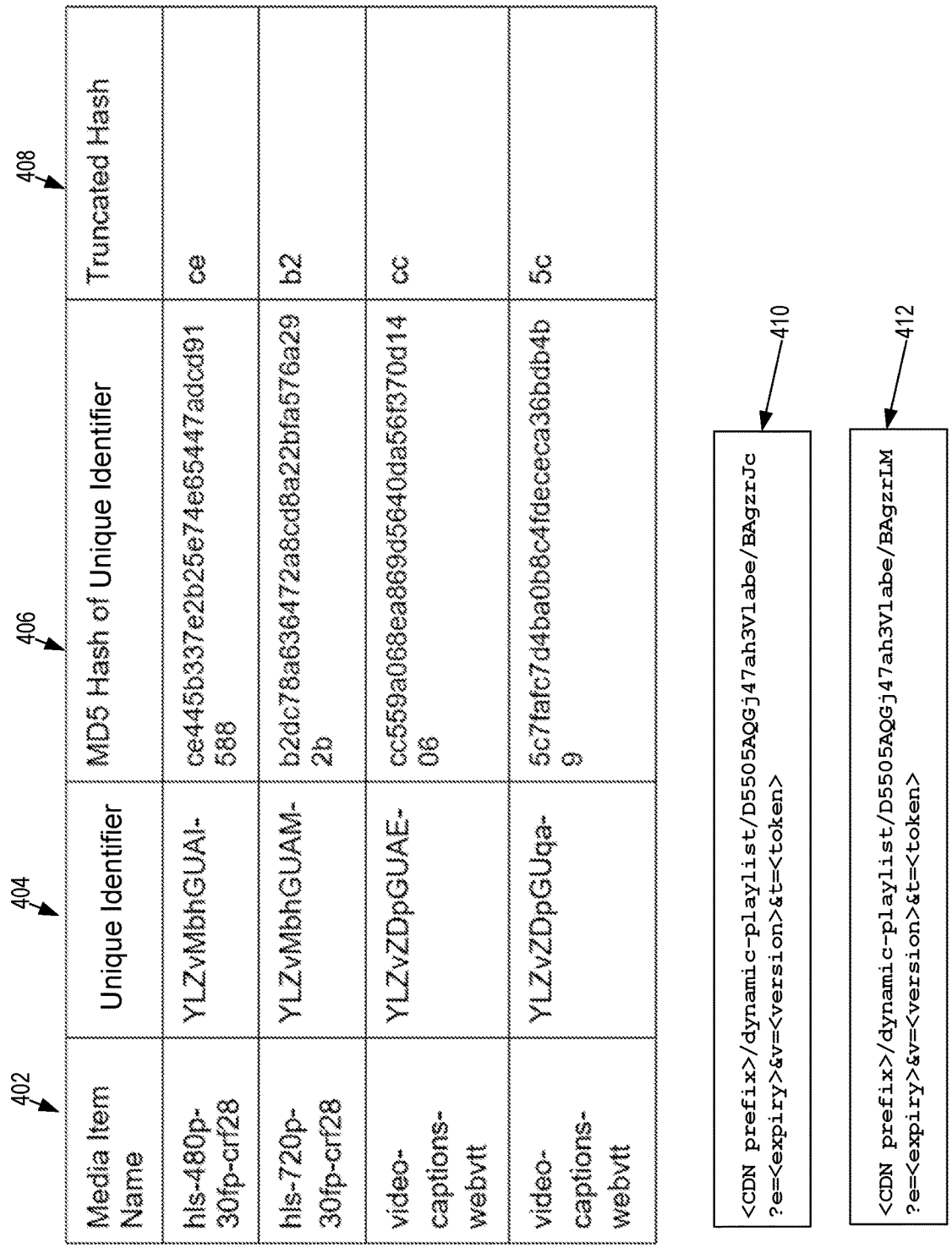
FIG. 4 is an example of a playlist summary used by the downloadable URL generator system in accordance with some embodiments of the present disclosure.

FIG. 4 is an example of a playlist summary used by the downloadable URL generator system in accordance with some embodiments of the present disclosure. As described above, the downloadable URL generator system receives the media item name 402 (e.g., a URN), a unique identifier 404 of the media player front end system 113, a hash 406 of the unique identifier 404, and a truncated hash 408. In the example illustrated by FIG. 4, by comparing the hashes 406, the minimum number of bytes required to represent each media item name uniquely is 2 bytes. The number of bytes needed to represent media items uniquely will increase as the number of media items associated with a media ID increases, but the truncated hashes remain an efficient representation of the media items.

As described above, the downloadable URL generator system generates a hyperlink, such as downloadable URLs 410 or 412. As described above with reference to FIG. 1, to form the downloadable URL 410, the downloadable URL generator system identifies a truncated hash 408 that represents the hash 406 while minimizing the size of the truncated hash 408. In the downloadable URL 410, the playlist includes the media items identified by the truncated hashes 408 of ce, b2, and cc. The truncated hashes 408 are computed dynamically during formation of the downloadable URL 410. In another example illustrated by FIG. 4, the downloadable URL 412 includes the media items identified by the truncated hashes 408 of ce, b2, and 5c. The downloadable URLs 410 and 412 include a compressed representation of the playlist summary that is generated based on the media ID. In the example illustrated by FIG. 4, a portion of the downloadable URL 410 includes a set of characters corresponding to the media items. In the portion of the downloadable like that includes "BAgzrJc," the first character "B" specifies a version of the playlist summary. The two characters "Ag" specifies a number of bytes to represent each media item in base 64, which means that each representation uses 2 Bytes. The characters following "BAg" summarize the media items that should be served under this URL. For example, "zrJc" is a base64 encoded string of concatenation of binary forms of "ce", "b2", and "cc" that each correspond to a media item.

In some embodiments, the downloadable URLs use a pre-determined prefix to signal the downloadable URL generator system 146 to perform verification for the URLs for each media item from the asset management system 142 and generate accurate playlist data. To perform verification, the downloadable URL generator system 146 checks the location and accessibility of the media items to be included in the downloadable URL. As described above, the downloadable URLs include a playlist summary, which can be encoded using base64.

Figure 5:
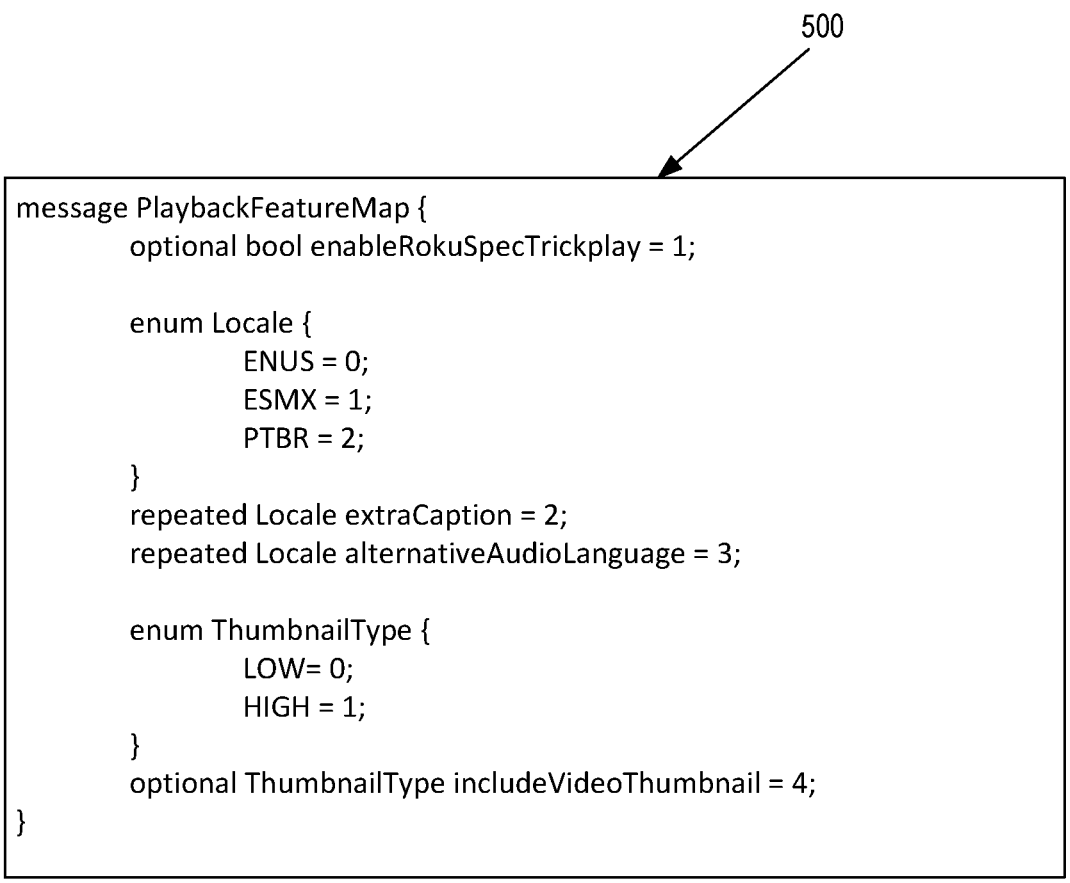
FIG. 5 is an example of a feature map 500 in accordance with some embodiments of the present disclosure.

FIG. 5 is an example of a feature map 500 in accordance with some embodiments of the present disclosure. The feature map is included in the playback context depending on the specific configuration of the media player front end system 113, generated by some video players. The feature map is optional and may be omitted if a feature map is not included in the playback request. The feature map 500 should define all optional media player settings, since each different media player enables different features based on the on-device setting, geo-location, and/or playback platform. Each feature map 500 includes a number of key-value pairs that have an exact mapping to features of the media players. For example, a feature map can define supported languages, captioning, or thumbnail image types (low resolution, high resolution, etc.).

In some embodiments, a condensed or compressed version of a feature map is generated by serializing the key values in the key-value pairs for the specific features requested. Serialization is useful, for example, in cases where the key names in the key-value pairs can have very long field lengths (e.g., text length measured in number of characters) in comparison to the corresponding values in the key-value pairs, which have relatively short field lengths in comparison to the key names. For example, a key-value pair of [enableRokuSpec Trickplay, true] has a relatively long key name of over 20 characters and a relatively short value of only 4 characters. Serializing the key values pair replaces the key name with an integer field tag, where the integer field tag is typically a value whose length is much smaller than the length of the key name. For example, the value of the integer field tag is retrieved from a predefine mapping between the feature name and feature index, in some embodiments. The use of serialization in this context makes the serialized version of the key name very concise. By applying serialization, the previous example of the key-value pair having the key name "enableRokuSpecTrickplay" and the corresponding value of "true" could be represented as [1, true], where "1" is mapped to the feature name in the predefined mapping between the feature name and the feature index.

Serialization as described herein is also useful, for example, when certain media items are not supported in certain media players. For instance, serialization enables a specific set of playback features to be included in the URL while leveraging the same cache entry in CDN to serve that set of playback features by various different kinds or versions of media players. In the example provided by FIG. 5, the locations of United States, Mexico, and Brazil with corresponding languages of English, Spanish, and Portuguese are defined by the feature map 500. Because certain media items are not supported by different media players, including the feature map in the downloadable URL enables use of a single cache entry in the CDN to provide the media items to different kinds of players that request the same playback features instead of requiring separate cache entries for each media player. Returning to the example depicted in FIG. 5, the supported languages by the media player are English, Spanish, and Portuguese. As further illustrated by FIG. 5, the media player is requesting a video thumbnail image to be included with the downloadable URL.

In this way, various aspects of the disclosed technologies, including the use and serialization of feature maps, allow front end video players to modify the media downloadable URLs dynamically. The back end server can use these player-provided modifications to dynamically determine how to serve different particular playback requests for different media players in different versions and/or platforms.

Figure 6:
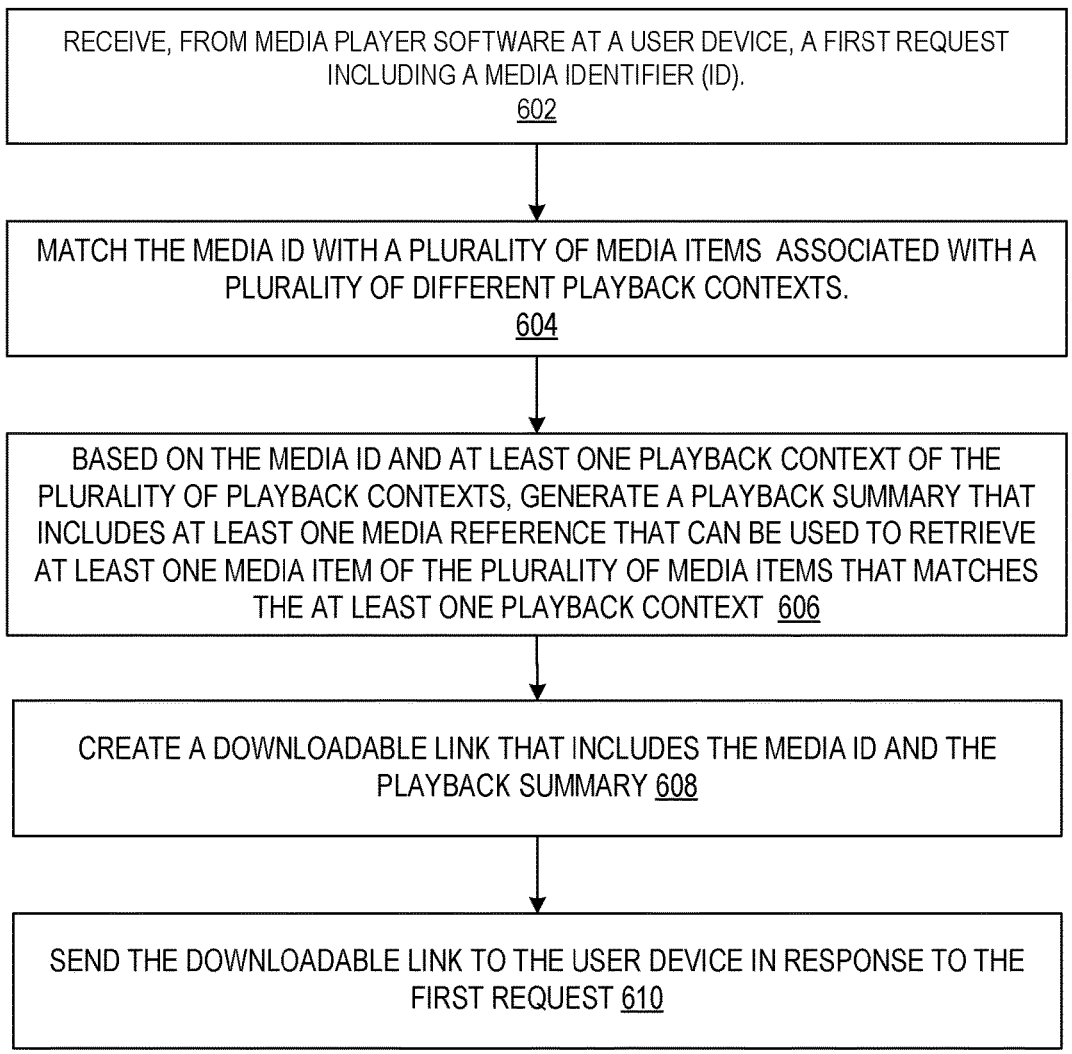
FIG. 6 is a flow diagram of an example method 600 to implement a downloadable URL generator system in accordance with some embodiments of the present disclosure.

FIG. 6 is a flow diagram of an example method 600 to implement a downloadable URL generator in accordance with some embodiments of the present disclosure.

The method 600 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, method 600 is performed by portions of media player front end system 113 and/or portions of online media hosting service 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 602, the processing device receives, from media player software at a user device, a first request including a media identifier (ID). Operation 602 is performed, for example, by the online media hosting service 140, described above, in communication with media player front end system 113 of user system 110, described above.

In some implementations, the media player front end system 113 includes a graphical user interface presented to an end user by the user system 110. In some implementations, the graphical user interface includes a playback window, at least one playback control element, and a playback context of one or more additional media items. A media item is played in the graphical user interface at user system 110.

At operation 604, the processing device matches the media ID with multiple media items associated with different playback contexts. Operation 604 is performed, for example, by asset management system 142, described above, in communication with asset management system 142, described above.

At operation 606, the processing device generates a playlist summary based on the media ID and at least one playback context of the plurality of playback contexts, where the playlist summary includes at least one media reference that can be used to retrieve at least one media item of the plurality of media items that matches the at least one playback context. Operation 606 is performed, for example, by the asset management system 142, described above.

At operation 608, the processing device creates a downloadable URL that includes the media ID and the playlist summary. Operation 608 is performed, for example, by downloadable URL generator system 146, described above, in communication with asset management system 142, described above.

At operation 610, the processing device sends the downloadable URL to the user device in response as described above. Operation 610 is performed, for example, by the downloadable URL generator system 146, described above.

FIG. 7 is a block diagram of an example computer system 700 including a media player system 750 in accordance with some embodiments of the present disclosure. The media player system 750 includes portions of media player front end system 113 and/or portions of online media hosting service 140. In FIG. 7, an example machine of computer system 700 is shown, within which a set of instructions for causing the machine to perform any of the methodologies discussed herein, can be executed. In some embodiments, the computer system 700 can correspond to a component of a networked computer system (e.g., as a component of the computing system 100 of FIG. 1) that includes, is coupled to, or utilizes a machine to execute an operating system to perform operations corresponding to portions of media player front end system 113 and/or portions of online media hosting service 140 of FIG. 1. For example, computer system 700 corresponds to a portion of a user system 110 when the user system 110 is executing media player front end system 113, and computer system 700 corresponds to a portion of application software system 130 and/or online media hosting service 140 when the application software system 130 and/or online media hosting service 140 is executing downloadable URL generator system 146.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a memory 706 (e.g., flash memory, static random access memory (SRAM), etc.), an input/output system 710, and a data storage system 740, which communicate with each other via a bus 730.

Processing device 702 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be at least one special-purpose processing device such as an application specific integrated circuit (ASIC), a field programmable gate array (FPGA), a digital signal processor (DSP), network processor, or the like. The processing device 702 is configured to execute instructions 712 for performing the operations and steps discussed herein.

In FIG. 7, media player system 750 represents media player front end system 113 when the user system 110 is executing media player front end system 113, and media player system 750 represents asset management system 142 or downloadable URL generator system 146 when the application software system 130 and/or online media hosting service 140 is executing asset management system 142 or downloadable URL generator system 146. Instructions 712 include portions of the media player system 750 when those portions of the media player system 750 are being executed by processing device 702. Thus, similar to the description above, the media player system 750 is shown in dashed lines as part of instructions 712 to illustrate that, at times, portions of the media player system 750 are executed by processing device 702. For example, when at least some portion of the media player system 750 is embodied in instructions to cause processing device 702 to perform the method(s) described above, some of those instructions can be read into processing device 702 (e.g., into an internal cache or other memory) from main memory 704 and/or data storage system 740. However, it is not required that all of the media player system 750 be included in instructions 712 at the same time and portions of the media player system 750 are stored in at least one other component of computer system 700 at other times, e.g., when at least one portion of the media player system 750 are not being executed by processing device 702.

The computer system 700 further includes a network interface device 708 to communicate over the network 720. Network interface device 708 provides a two-way data communication coupling to a network. For example, network interface device 708 can be an integrated-services digital network (ISDN) card, cable modem, satellite modem, or a modem to provide a data communication connection to a corresponding type of telephone line. As another example, network interface device 708 can be a local area network (LAN) card to provide a data communication connection to a compatible LAN. Wireless links can also be implemented. In any such implementation network interface device 708 can send and receive electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 700.

Computer system 700 can send messages and receive data, including program code, through the network(s) and network interface device 708. In the Internet example, a server can transmit a requested code for an application program through the Internet and network interface device 708. The received code can be executed by processing device 702 as it is received, and/or stored in data storage system 740, or other non-volatile storage for later execution.

The input/output system 710 includes an output device, such as a display, for example a liquid crystal display (LCD) or a touchscreen display, for displaying information to a computer user, or a speaker, a haptic device, or another form of output device. The input/output system 710 can include an input device, for example, alphanumeric keys and other keys configured for communicating information and command selections to processing device 702. An input device can, alternatively or in addition, include a cursor control, such as a mouse, a trackball, or cursor direction keys for communicating direction information and command selections to processing device 702 and for controlling cursor movement on a display. An input device can, alternatively or in addition, include a microphone, a sensor, or an array of sensors, for communicating sensed information to processing device 702. Sensed information can include voice commands, audio signals, geographic location information, and/or digital imagery, for example.

The data storage system 740 includes a machine-readable storage medium 742 (also known as a computer-readable medium) on which is stored at least one set of instructions 744 or software embodying any of the methodologies or functions described herein. The instructions 744 can also reside, completely or at least partially, within the main memory 704 and/or within the processing device 702 during execution thereof by the computer system 700, the main memory 704 and the processing device 702 also constituting machine-readable storage media.

In one embodiment, the instructions 744 include instructions to implement functionality corresponding to a media player (e.g., the media player front end system 113 and/or online media hosting service 140 of FIG. 1).

Dashed lines are used in FIG. 7 to indicate that it is not required that the media player system 750 be embodied entirely in instructions 712, 714, and 744 at the same time. In one example, portions of the media player are embodied in instructions 744, which are read into main memory 704 as instructions 714, and portions of instructions 714 are read into processing device 702 as instructions 712 for execution. In another example, some portions of the media player are embodied in instructions 744 while other portions are embodied in instructions 714 and still other portions are embodied in instructions 712.

While the machine-readable storage medium 742 is shown in an example embodiment to be a single medium, the term "machine-readable storage medium" should be taken to include a single medium or multiple media that store the at least one set of instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing systems, can carry out the above-described computer-implemented methods in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

In an example 1, a method includes receiving, from media player software at a user device, a first request including a media identifier (ID); matching the media ID with a plurality of media items associated with a plurality of different playback contexts; based on the media ID and at least one playback context of the plurality of different playback contexts, generating a playlist summary including at least one media reference that can be used to retrieve at least one media item of the plurality of media items that matches the at least one playback context; creating a downloadable URL including the media ID and the playlist summary; and sending the downloadable URL to the user device in response to the first request.

An example 2 includes the subject matter of example 1, where a playback context of the plurality of different playback contexts includes metadata associated with at least one of the media player software or the user device. An example 3 includes the subject matter of example 1 or example 2, where creating the downloadable URL includes: using the at least one media reference, executing a search to determine a server location of the at least one media item; generating a uniform resource locator (URL) that can be used to access the server location of the at least one media item; and including the URL in the downloadable URL. An example 4 includes the subject matter of any of examples 1-3, where determining the at least one media reference includes: determining a geolocation of the user device; and using the geolocation of the user device, selecting a first playback context of the plurality of playback contexts, where the first playback context and at least one other playback context of the plurality of different playback contexts are associated with different geolocations. An example 5 includes the subject matter of any of examples 1-4, where creating the downloadable URL further includes including a media reference associated with the first playback context in the downloadable URL. An example 6 includes the subject matter of any of examples 1-5, further including: receiving a second request from the user device; and in response to the second request, providing the at least one media item to the user device. An example 7 includes the subject matter of any of examples 1-6, where a media item of the plurality of media items includes a video, a progress bar associated with the video, a set of preview images associated with the video, an alternative rendering of the video, a set of subtitles associated with the video, an alternative language audio track associated with the video, or an alternative display size of the video. An example 8 includes the subject matter of any of examples 1-7, further including: generating a compressed representation of the at least one media reference; and including the compressed representation in the downloadable URL. An example 9 includes the subject matter of any of examples 1-8, where the first request further includes a feature map including at least one of an on-device setting, geo-location, or playback platform.

In an example 10 a method includes: sending, from media player software at a user device to a server, a first request including a media identifier (ID); receiving, from the server, a downloadable URL including the media ID and a playlist summary including at least one media reference that can be used to access at least one media item of a plurality of media items associated with a plurality of different playback contexts; sending, to the server, a second request including the at least one media reference; and receiving the at least one media item.

An example 11 includes the subject matter of example 10, where each media item of the plurality of media items includes an associated playback context identifying a set of features representing perceptual attributes of the media item, the perceptual attributes including at least one of a language, a height of a first media item, a width of the first media item, or subtitles. An example 12 includes the subject matter of example 10 or example 11, where the downloadable URL including the media ID and the at least one media reference includes: a first portion of the downloadable URL that identifies an access location of a storage location for each media item; and a second portion of the downloadable URL that identifies the playback context associated with the media ID. An example 13 includes the subject matter of any of examples 10-12, further including: identifying, in the first request, a location of the user device; and where receiving a downloadable URL includes receiving a selection of a playback context corresponding to the location of the user device. An example 14 includes the subject matter of any of examples 10-13, where the plurality of media items includes at least one of progress bar preview images, alternative renderings of video content, or subtitle frames. An example 15 includes the subject matter of any of examples 10-14, where the first request further includes a feature map including at least one of an on-device setting, geo-location, or playback platform.

In an example 16, a system includes: at least one memory device; and a processing device, operatively coupled to the at least one memory device, to: receive, from a media player software at a user device, a first request including a media identifier (ID); match the media ID with a plurality of media items associated with a plurality of different playback contexts; based on the media ID and at least one playback context of the plurality of different playback contexts, generate a playlist summary including at least one media reference that can be used to retrieve at least one media item of the plurality of media items that matches the at least one playback context; create a downloadable URL including the media ID and the playlist summary; and send the downloadable URL to the user device in response to the first request.

An example 17 includes the subject matter of example 16, where a playback context of the plurality of different playback contexts includes metadata associated with at least one of the media player software or the user device. An example 18 includes the subject matter of example 16 or example 17, where to create the downloadable URL, the processing device is caused to: using the at least one media reference, execute a search to determine a server location of the at least one media item; generate a uniform resource locator (URL) that can be used to access the server location of the at least one media item; and include the URL in the downloadable URL. An example 19 includes the subject matter of any of examples 16-18, where to determining the at least one media reference, the processing device is caused to: determine a geolocation of the user device; and using the geolocation of the user device, select a first playback context of the plurality of playback contexts, where the first playback context and at least one other playback context of the plurality of different playback contexts are associated with different geolocations. An example 20 includes the subject matter of any of examples 16-19, where to create the downloadable URL further causes the processing device to include a media reference associated with the first playback context in the downloadable URL.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    receiving, from media player software at a user device, a first request including a media identifier (ID) of a media item comprising at least one multimedia file;
    using the media ID to identify a plurality of additional media items, wherein the plurality of additional media items are associated with the media item and a plurality of different playback contexts, and a playback context is associated with at least one perceptual attribute of the media item;
    in response to the media ID of the media item and at least one playback context of the plurality of different playback contexts, generating a playlist summary comprising at least one media reference, wherein the at least one media reference is configured to retrieve, from the plurality of additional media items identified using the media ID of the media item, at least one additional media item that corresponds to the at least one playback context;
using the playlist summary to create a downloadable uniform resource locator (URL) comprising the media ID of the media item and the at least one additional media item referenced in the playlist summary; and
sending the downloadable URL to the user device in response to the first request.

2. The method of claim 1, wherein a playback context of the plurality of different playback contexts comprises metadata associated with at least one of the media player software or the user device.

3. The method of claim 1, wherein creating the downloadable URL comprises:
using the at least one media reference, executing a search to determine a server location of the at least one additional media item;
generating a uniform resource locator (URL) that can be used to access the server location of the at least one additional media item; and
including the URL in the downloadable URL.

4. The method of claim 1, wherein determining the at least one media reference comprises:
determining a geolocation of the user device; and
using the geolocation of the user device, selecting a first playback context of the plurality of different playback contexts, wherein the first playback context and at least one other playback context of the plurality of different playback contexts are associated with different geolocations.

5. The method of claim 4, wherein creating the downloadable URL further comprises including a media reference associated with the first playback context in the downloadable URL.

6. The method of claim 1, further comprising:
receiving a second request from the user device; and
in response to the second request, providing the at least one additional media item to the user device.

7. The method of claim 1, wherein an additional media item of the plurality of additional media items comprises a video, a progress bar associated with a video, a set of preview images associated with a video, an alternative rendering of a video, a set of subtitles associated with a video, an alternative language audio track associated with a video, or an alternative display size of a video.

8. The method of claim 1, further comprising:
generating a compressed representation of the at least one media reference; and
including the compressed representation in the downloadable URL.

9. The method of claim 1, wherein the first request further includes a feature map comprising at least one of an on-device setting, geo-location, or playback platform.

10. A method comprising:
sending, from media player software at a user device to a server, a first request including a media identifier (ID) of a media item comprising at least one multimedia file;
receiving, from the server, a downloadable URL comprising the media ID of the media item and a playlist summary comprising at least one media reference configured to access at least one additional media item of a plurality of media items associated with the media item and a plurality of different playback contexts, wherein a playback context is associated with at least one perceptual attribute of the media item;
sending, to the server, a second request comprising the at least one media reference; and
receiving the at least one additional media item.

11. The method of claim 10, wherein an additional media item of the plurality of media items has an associated playback context identifying a set of features representing the at least one perceptual attributes of the media item, the at least one perceptual attributes including at least one of a language, a height of a first media item, a width of the first media item, or subtitles.

12. The method of claim 10, wherein the downloadable URL comprises the media ID of the media item and the at least one media reference comprises:
a first portion of the downloadable URL that identifies an access location of a storage location for an additional media item; and
a second portion of the downloadable URL that identifies the playback context associated with the media ID of the media item.

13. The method of claim 10, further comprising:
identifying, in the first request, a location of the user device, wherein receiving a downloadable URL includes receiving a selection of playback context corresponding to the location of the user device.

14. The method of claim 10, wherein the plurality of additional media items includes at least one of progress bar preview images, alternative renderings of video content, or subtitle frames.

15. The method of claim 10, wherein the first request further includes a feature map comprising at least one of an on-device setting, geo-location, or playback platform.

16. A system comprising:
at least one memory device; and
a processing device, operatively coupled to the at least one memory device, to perform operations comprising:
receiving, from media player software at a user device, a first request including a media identifier (ID) of a media item;
using the media ID to identify a plurality of additional media items, wherein the plurality of additional media items are associated with a plurality of different playback contexts and a playback context is associated with at least one perceptual attribute of the media item;
based on the media ID and at least one playback context of the plurality of different playback contexts, generating a playlist summary comprising at least one media reference, wherein the at least one media reference is configured to retrieve, from the plurality of additional media items identified using the media ID, at least one additional media item that corresponds to the at least one playback context;
using the playlist summary to create a downloadable uniform resource locator (URL) comprising the media ID of the media item and the at least one additional media item referenced in the playlist summary; and
sending the downloadable URL to the user device in response to the first request.

17. The system of claim 16, wherein a playback context of the plurality of different playback contexts comprises metadata associated with at least one of the media player software or the user device.

18. The system of claim 16, wherein to create the downloadable URL, the processing device is caused to:
    using the at least one media reference, execute a search to determine a server location of the at least one additional media item;
    generate a uniform resource locator (URL) that can be used to access the server location of the at least one additional media item; and
    include the URL in the downloadable URL.

19. The system of claim 16, wherein to determining the at least one media reference, the processing device is caused to:
    determine a geolocation of the user device; and
    using the geolocation of the user device, select a first playback context of the plurality of different playback contexts, wherein the first playback context and at least one other playback context of the plurality of different playback contexts are associated with different geolocations.

20. The system of claim 19, wherein to create the downloadable URL further causes the processing device to include a media reference associated with the first playback context in the downloadable URL.

\* \* \* \* \*